United States Patent
Farmer et al.

(10) Patent No.: US 8,106,821 B2
(45) Date of Patent: Jan. 31, 2012

(54) METHODS AND APPARATUSES FOR USE WITH MODE-SWITCHABLE NAVIGATION RADIO

(75) Inventors: Dominic Gerard Farmer, Los Gatos, CA (US); Jie Wu, San Diego, CA (US); Lalitaprasad V. Daita, San Jose, CA (US); Douglas Neal Rowitch, Del Mar, CA (US); Wyatt Thomas Riley, Wayne, PA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 12/400,595

(22) Filed: Mar. 9, 2009

(65) Prior Publication Data
US 2009/0322605 A1    Dec. 31, 2009

Related U.S. Application Data

(60) Provisional application No. 61/076,512, filed on Jun. 27, 2008.

(51) Int. Cl.
*G01S 19/23* (2010.01)
*G01S 19/34* (2010.01)
(52) U.S. Cl. .............. 342/357.62; 342/357.74
(58) Field of Classification Search ............ 342/357.62, 342/357.74, 357.63
See application file for complete search history.

(56) References Cited

U.S. PATENT DOCUMENTS

| | | | |
|---|---|---|---|
| 5,592,173 A | 1/1997 | Lau et al. | |
| 5,650,785 A | 7/1997 | Rodal | |
| 5,654,718 A | 8/1997 | Beason et al. | |
| 5,864,315 A | 1/1999 | Welles, II et al. | |
| 5,874,914 A * | 2/1999 | Krasner | 342/357.29 |
| 6,141,570 A | 10/2000 | O'neill, Jr. et al. | |
| 6,297,771 B1 * | 10/2001 | Gronemeyer | 342/378 |
| 6,590,525 B2 * | 7/2003 | Yule et al. | 342/357.74 |
| 6,662,107 B2 | 12/2003 | Gronemeyer | |
| 6,856,905 B2 * | 2/2005 | Pasturel et al. | 701/214 |
| 7,034,695 B2 | 4/2006 | Troxler | |
| 7,065,320 B2 | 6/2006 | Ishigaki et al. | |
| 2007/0152878 A1 * | 7/2007 | Wang et al. | 342/357.06 |
| 2008/0150797 A1 * | 6/2008 | Jia et al. | 342/357.06 |

FOREIGN PATENT DOCUMENTS

| WO | WO 2005010549 A2 * | 2/2005 |
|---|---|---|
| WO | WO2006024112 | 3/2006 |

OTHER PUBLICATIONS

International Search Report & Written Opinion—PCT/US2009/048818, International Search Authority—European Patent Office—Oct. 6, 2009.

* cited by examiner

*Primary Examiner* — Thomas Tarcza
*Assistant Examiner* — John Vigushin
(74) *Attorney, Agent, or Firm* — Liberty E. Mann

(57) ABSTRACT

Methods and apparatuses are provided for use with mode switchable navigation radios and the like. The methods and apparatuses may be implemented to selectively switch between certain operating modes based, at least in part, a mode-switching test that takes into consideration one or more non-timed test conditions to determine if mode-switching may be enabled.

68 Claims, 3 Drawing Sheets

METHODS AND APPARATUSES FOR USE WITH MODE-SWITCHABLE NAVIGATION RADIO

RELATED APPLICATIONS

This patent application claims benefit of and priority to U.S. Provisional Patent Application 61/076,512, filed Jun. 27, 2008, and titled "Methods And Apparatuses For Use With Mode-Switchable Navigation Radio", and which is incorporated in its entirety by reference herein.

BACKGROUND

1. Field

The subject matter disclosed herein relates to electronic devices and, and more particularly to methods and apparatuses for use in devices having a mode switchable navigation radio.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information. Indeed, it is not uncommon for some devices to be operatively enabled to communicate with more than one wireless communication system and this trend appears to be growing.

Another popular and increasingly important wireless technology includes navigation systems and in particular satellite positioning systems (SPS) such as, for example, the global positioning system (GPS) and other like Global Navigation Satellite Systems (GNSS). SPS radios, for example, may receive wireless SPS signals that are transmitted by a plurality of orbiting satellites of a GNSS. The SPS signals may, for example, be processed to determine a global time, an approximate or accurate geographical location, altitude, and/or speed associated with a device having the SPS radio.

In certain implementations, navigation radios such as an SPS radio may be implemented to periodically switch ON/OFF at least a portion of its circuitry, for example, to save power. By way of example, certain navigation radios may be operatively enabled to switch between a receive mode wherein SPS signals may be acquired and/or tracked, and a sleep mode wherein at least a portion of the radio circuitry may be turned OFF (e.g., powered down in some manner and as such SPS signals may not be received in such a sleep mode. The switching between receive (e.g., ON) and sleep (e.g., OFF) modes may occur according to a duty cycle, for example.

SUMMARY

Methods and apparatuses are provided for use with mode switchable navigation radios and the like. The methods and apparatuses may be implemented to selectively switch between certain operating modes based, at least in part, a mode-switching test that takes into consideration one or more non-timed test conditions to determine whether mode-switching may be enabled.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
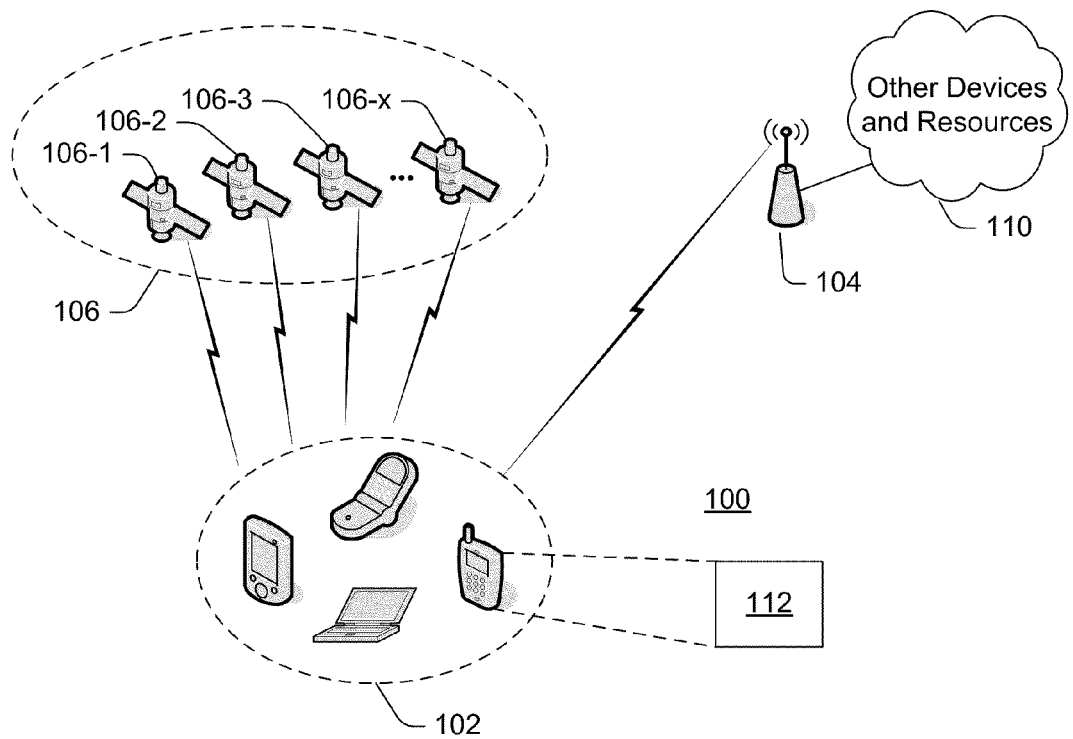
FIG. 1 is block diagram illustrating an exemplary environment that includes a device having position locating circuitry associated with a navigation radio.

Methods and apparatuses are provided for use with mode switchable navigation radios and the like. The methods and apparatuses may be implemented to selectively switch between certain operating modes based, at least in part, a mode-switching test that takes into consideration one or more non-timed test conditions to determine whether mode-switching may be enabled.

In certain exemplary implementations, such a mode-switching test may support dynamic optimization for switching at least a portion of position location circuitry within a navigation radio from a first mode to a second mode wherein if operating in the second mode the navigation radio may consume less electrical power. Such mode-switching test may, for example, consider certain non-timed test conditions that may be indicative of the navigation radio's ability to maintain or otherwise support a desired level of position location service/accuracy and/or attempt to meet other desired performance metrics.

By way of example but not limitation, such a first mode may be associated with a receive mode having essentially a 100% duty cycle (e.g., substantially always ON), and a second mode may be associated with a receive mode having less than a 100% duty cycle (e.g., possibly switching between ON and OFF).

In other example implementations, such first and second modes may together be associated with a given duty cycle, such that the first mode may be associated with an ON operation and the second mode may be associated with an OFF operation.

Such mode-switching, if enabled, may selectively switch back from the second mode to the first mode based, at least in part, on the occurrence of a mode switching event, such as, for example, a timed conditions (a timer, duty cycle, etc.), which may be predetermined, or varied and/or otherwise dynamically established based on one or more of non-timed test conditions and/or other operative or performance based factors.

In accordance with one aspect, an apparatus may be provided which includes position locating circuitry and a controller. The position locating circuitry may be operatively enabled to acquire wireless signals associated with a satellite positioning system (SPS) if operating in a first mode. The position locating circuitry may be operatively enabled to at least maintain local clock information and to not acquire the wireless signals at all or at certain times if operating in a second mode. In certain implementations, the local clock information may be or may have been previously substantially calibrated with a clock associated with an SPS clock signal (e.g., from a phase lock loop (PLL) circuit or other like within the radio).

The controller may, for example, be operatively enabled to selectively switch the position locating circuitry from the first mode to the second mode based, at least in part, on at least one mode-switching test being satisfied. The mode-switching test may be based, at least in part, on at least one non-timed test condition.

By way of example but not limitation, such non-timed test conditions may include one or more of: a first test condition wherein wireless signals of at least a first threshold signal strength have been acquired from a first set of space vehicles (SVs); a second test condition wherein wireless signals of at least the first threshold signal strength have been acquired from at least a first threshold number of SVs; a third test condition wherein wireless signals of at least a second threshold signal strength have been acquired from at least a second threshold number of SVs; a fourth test condition wherein SV position information is accessible for at least the first set of SVs; a fifth test condition wherein no additional SV position information is currently being received for any of the first set of SVs; a sixth test condition wherein no SVs are being acquired; a seventh test condition wherein an error associated with a current position location as determined based, at least in part, on at least a portion of the wireless signals associated with the SPS does not exceed a position location error threshold; an eighth test condition wherein the position locating circuitry is currently operating in the first mode; and/or a ninth test condition wherein Satellite Health information is not currently being received for any of the SVs. By way of example but not limitation, such non-timed test conditions may also and/or alternatively be combined in various manners.

In certain implementations, such non-timed test conditions may be combined to form a mode-switching test. For example, at least a first portion of a mode-switching test may be satisfied if the first test condition, and the seventh test condition and the eighth test condition and at least one or more of the fourth test condition and/or the fifth test condition are determined by the controller to be TRUE. For example, another mode-switching test may be satisfied if such a first portion of the mode-switching test is satisfied and if at least one of both the second test condition and the sixth test condition are determined by the controller to be TRUE and/or the third test condition is determined by the controller to be TRUE.

The second mode may include, for example, a reduced power mode in which at least a portion of the position locating circuitry operatively enabled to acquire the wireless signals may be turned OFF and/or otherwise deactivated in some manner at all times or at certain times. Hence, a second mode may have a duty cycle that may be 0% (e.g., never ON) or less than 100% (e.g., sometimes but not always ON).

The apparatus may also be enabled to operate in other modes and/or modified first modes that may prevent switching from a first mode to a second mode. By way of example but not limitation, a modified first mode may include at least one of an emergency service mode, an assisted service mode, an extended receiver ON mode, an initializing mode, a device power charging mode, a device communicating mode, and/or a detected device movement mode.

The controller may also be operatively enabled to selectively switch the position locating circuitry from the second mode back to the first mode based, at least in part, on an occurrence of a mode-switching event. For example, a mode-switching event may be associated with a timed period and/or associated with the mode-switching test no longer being satisfied.

In accordance with another aspect, an exemplary method may include, with position locating circuitry operating in a first mode, acquiring wireless signals associated with a satellite positioning system (SPS). The method may also include selectively switching the position locating circuitry from a first mode to a second mode based, at least in part, on at least one mode-switching test being satisfied, wherein the mode-switching test may be based, at least in part, on at least one non-timed test condition. The method may further include, with the position locating circuitry operating in the second mode, maintaining local clock information substantially calibrated with a clock associated with the SPS and either not acquiring wireless signals or acquiring wireless signals less often than during a first mode. In certain implementations the method may also include selectively switching the position locating circuitry from the second mode to the first mode based, at least in part, on an occurrence of a mode-switching event.

In accordance with yet another aspect, an apparatus may be implemented which may include a radio for acquiring wireless signals associated with a SPS if the apparatus is operating in a first mode, circuitry for maintaining local clock information substantially calibrated with a clock associated with the SPS while not acquiring the wireless signals if the apparatus may be operating in a second mode, and a controller for selectively switching an operation of the apparatus from the first mode to the second mode based, at least in part, on at least one mode-switching test being satisfied, wherein the mode-switching test may be based, at least in part, on at least one non-timed test condition.

In accordance with still other aspects, an article may be provided that includes a computer readable medium having computer implementable instructions stored thereon. The instructions, if implemented by one or more processing units, may adapt the one or more processing units to determine if at least one mode-switching test may be satisfied, the at least one mode-switching test being based, at least in part, on at least one non-timed test condition. In response to the mode-switching test being determined as being satisfied, the one or more processing units may selectively switch position locating circuitry operating in a first mode in which wireless signals associated with a satellite positioning system (SPS) may be acquired to a second mode wherein local clock information substantially calibrated with a clock associated with the SPS is maintained but the wireless signals are either not being acquired or are acquired less often than during a first mode.

FIG. 1 is a block diagram illustrating a wireless environment 100 that may include various computing and communication resources operatively enabled to provide navigation services and possibly other communication services in accordance with certain exemplary implementations of the present description.

Wireless environment 100 may be representative of any system(s) or a portion thereof that may include at least one device 102 operatively enabled to at least receive wireless signals associated with at least one navigation system 106 (e.g., a satellite positioning system (SPS, and/or the like). Device 102, as illustrated in this example, may also be operatively enabled to send/receive signals with at least one wireless system 104.

Device 102 may, for example, include a mobile device or a device that while movable may be primarily intended to remain stationary. Thus, as used herein, the terms "device"

and "mobile device" may be used interchangeable as each term is intended to refer to any single device or any combinable group of devices that may transmit and/or receive wireless signals. The terms "receive" and "acquire" are used interchangeably herein and are both intended to represent the reception of a wireless signal such that information that is carried via the wireless signal may be operatively acquired by the receiving device.

With this in mind and by way of example but not limitation, as illustrated using icons in FIG. 1, device 102 may include a mobile device such as a cellular phone, a smart phone, a personal digital assistant, a portable computing device, and/ or the like or any combination thereof. In other exemplary implementations, device 102 may take the form of a machine that is mobile or stationary. In still other exemplary implementations, device 102 may take the form of one or more integrated circuits, circuit boards, and/or the like that may be operatively enabled for use in another device.

Regardless of the form of device 102, device 102 may include at least one navigation radio 112 of which at least a portion may be enabled to operate according to two or more modes of operation. The term "radio" as used herein refers to any circuitry and/or the like that may be operatively enabled to at least receive wireless signal. In certain implementations a radio may also be operatively enabled to transmit wireless signals. In certain implementations, device 102 may include two or more radios. Such radios may, for example, be operatively enabled to share a portion of circuitry and/or the like (e.g., a processing unit, memory, antenna, power supply, etc.).

By way of example but not limitation, in some of the examples presented herein device 102 may include a first radio that is operatively enabled to receive wireless signals associated with at least one navigation system 106 and a second radio that is operatively enabled to receive and transmit wireless signals associated with at least one wireless system 104. Wireless system 104 may include, for example, a wireless communication system, such as, e.g., a wireless telephone system, a wireless local area network, and/or the like. Wireless system 104 may include, for example, a wireless broadcast system, such as, e.g., a television broadcast system, a radio broadcast system, and/or the like. In certain implementations, device 102 may be operatively enabled only to receive wireless signals from wireless system 104, while in other implementations mobile station 102 may be operatively enabled only to transmit wireless signals to wireless system.

As illustrated in FIG. 1, wireless system 104 may be operatively enabled to communicate with and/or otherwise operatively access other devices and/or resources as represented simply by cloud 110. For example, cloud 110 may include one or more communication devices, systems, networks, or services, and/or one or more computing devices, systems, networks, the Internet, various computing and/or communication services, and/or the like, or any combination thereof.

Wireless system 104 may, for example, be representative of any wireless communication system or network that may be operatively enabled to receive and/or transmit wireless signals. By way of example but not limitation, wireless system 104 may include a wireless wide area network (WWAN), a wireless local area network (WLAN), a wireless personal area network (WPAN), a wireless metropolitan area network (WMAN), a Bluetooth communication system, WiFi communication system, Global System for Mobile communications (GSM) system, Evolution Data Only/Evolution Data Optimized (EVDO) communication system, Ultra Mobile Broadband (UMB) communication system, Long Term Evolution (LTE) communication system, Mobile Satellite Service-Ancillary Terrestrial Component (MSS-ATC) communication system, and/or the like.

The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Such location determination techniques described herein may also be used for any combination of WWAN, WLAN, WPAN, WMAN, and/ or the like.

Wireless system 104 may, for example, be representative of any wireless broadcast system that may be operatively enabled to at least receive wireless signals. By way of example but not limitation, a wireless broadcast system may include a MediaFLO system, a Digital TV system, a Digital Radio system, a Digital Video Broadcasting-Handheld (DVB-H) system, a Digital Multimedia Broadcasting (DMB) system, an Integrated Services Digital Broadcasting-Terrestrial (ISDB-T) system, and/or other like systems and/or related broadcast techniques.

Device 102 may be operatively enabled to at least receive wireless signals from at least one navigation system 106 which is illustrated in FIG. 1 as a satellite positioning system (SPS) having a plurality of SPS signal transmitting satellites 106-1, 106-2, 106-3, . . . , 106-x. Indeed, in certain example implementations, device 102 may only be configured to receive wireless signals, such as, SPS signals. Here, for example, device 102 may include a personal navigation device (PND), personal navigation assistant (PNA), and/or the like. In other example implementations, device 102 may also communicate with other devices via wired and/or wireless transmitted signals. Here, for example as illustrated in FIG. 1, device 102 may transmit signals to wireless system 104. Those skilled in the art will recognize that navigation system 106 may include additional transmitting and/or other supporting resources in addition to or instead of the satellites as illustrated.

In certain implementations, navigation system 106 may be operatively enabled to provide other non-navigation related services (e.g., communication services, or the like). As such, in certain implementations device 102 may be operatively enabled to transmit wireless signals to navigation system 106.

The space vehicles (SVs) of navigation system 106 may be operatively enabled to transmit a unique wireless signal (SPS signal) of which, at least a portion, may be received by device 102 and used in some manner for navigation, for example, to determine a time, a range, a location, a position, etc. The specific navigation signaling and location determining techniques may vary depending on the navigation system(s) being used. Such SVs may be operatively enabled to transmit one or more signals at the same or different carrier frequencies. For example, a GPS satellite may be operatively enabled to transmit L1 C/A and L1C signals in the same band, as well as, the L2C and L5 signals at other carrier frequencies, etc. Furthermore, such SPS signals may include encrypted signals.

A SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting SVs. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation. In accordance with certain aspects, the techniques presented herein are not restricted to global systems (e.g., GNSS) for SPS. For example, the techniques provided herein may be applied to or otherwise operatively enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise operatively enabled for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit SPS and/or SPS-like signals that may also be interfered with by certain wireless communication signals, etc. Thus, as used herein an SPS may include any combination of one or more global and/or regional navigation satellite systems and/or augmentation systems, and SPS signals may include SPS, SPS-like, and/or other signals associated with such one or more SPS.

To estimate its location, device 102 may determine pseudorange measurements to SVs that are "in view" of its receiving radio using well known techniques based, at least in part, on detections of PN codes in signals received from the SVs. Such a pseudorange to a SV may be determined based, at least in part, on a code phase detected in a received signal marked with a PN code associated with the SV during a process of acquiring the received signal at the receiving radio. To acquire the received signal, device 102 may, for example, be operatively enabled to correlate the received signal with a locally generated PN code associated with a SV. For example, device 102 may correlate such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Thus, in certain implementations, device 102 may be operatively enabled to determine its location in such a manner or other like manner without additional support from other devices. In other implementations, however, device 102 may be enabled to operate in some manner with one or more other devices to determine its location and/or to support other navigation related operations. Such navigation techniques are well known.

In certain implementations, device 102 may be operatively enabled to receive SPS signals from one or more GNSS, such as, for example, GPS, Galileo, GLONASS, Compass, or other like system that uses a combination of these systems, or any SPS developed in the future, each referred to generally herein as a SPS. As used herein, an SPS will also be understood to include pseudolite systems.

Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites may be useful in situations where signals from an orbiting SV might be unavailable, such as in tunnels, mines, buildings, urban canyons or other enclosed areas. Another implementation of pseudolites is known as radio-beacons. The terms "satellite" and "SV", as used herein, are interchangeable and intended to include pseudolites, equivalents of pseudolites, and possibly others. The term "SPS signals", as used herein, is intended to include SPS-like signals from pseudolites or equivalents of pseudolites.

Figure 2:
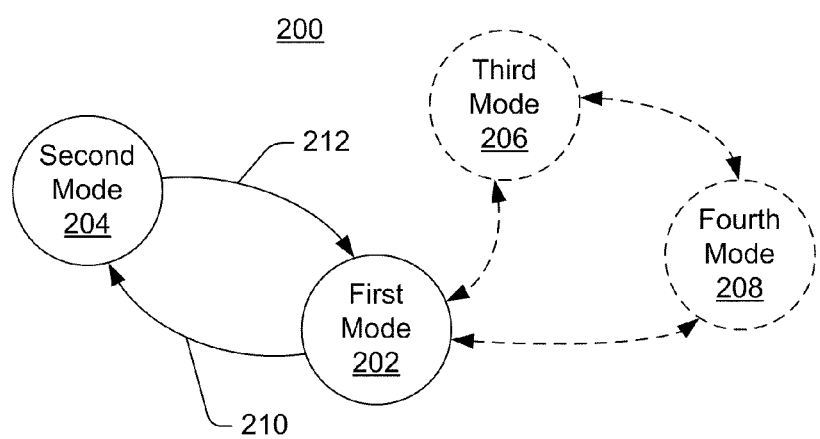
FIG. 2 is an illustrative state diagram showing various exemplary modes in which position locating circuitry within a device, for example, as in FIG. 1, may be operatively enabled to operate.

Reference is now made to FIG. 2, which is a state diagram illustrating certain exemplary operating mode environment 200 that device 102 may be selectively operatively enabled to implement with regard to at least a portion of radio 112. Here, for example, operating mode environment 200 may be implemented to allow device 102 and/or at least a portion of radio 112 to selectively operate in at least a first mode 202 or a second mode 204.

In certain example implementations, first mode 202 may operatively adapt device 102 and/or at least a portion of radio 112 to receive and acquire SPS signals in support of various search operations, verification operations, tracking operations, and/or the like. Such a first mode 202 may, for example, require various circuitries within device 102 and/or at least a portion of radio 112 to be turned ON and operating in some manner. For example, an RF front-end circuit and/or signal processor circuitry may be functioning to receive and acquire one or more SPS signals. First mode 202 may, for example, be associated with a duty cycle that may be 100% (e.g., substantially always ON).

Device 102 and/or at least a portion of radio 112 may, for example, be operatively enabled to transition per transition action 210 from first mode 202 to second mode 204. Various techniques are presented in subsequent sections illustrating certain exemplary tests and/or conditions that may be considered by controlling logic or the like to initiate transition action 210.

In certain example implementations, second mode 204 may adapt at least a portion of radio 112 to reduce power consumption by turning OFF or otherwise affecting the operation of all or part of the circuitry associated with receiving, acquiring, and/or otherwise processing SPS signals. For example, all or part of an RF front-end circuit and/or all or part of signal processor circuitry may be turned OFF (e.g., powered down, disabled, or otherwise altered) such that device 102 no longer receives and/or acquires SPS signals. Thus, second mode 204 may, for example, be associated with a duty cycle that may be 0% (e.g., never ON) or less than 100% (e.g., not always ON). By way of example but not limitation, second mode 204 may be associated with a duty cycle of 20% for a period of time (e.g., one second) such that device 102 and/or at least a portion of radio 112 may remain OFF for 80% of the period of time (e.g., 800 milliseconds) and ON for 20% of the period of time (e.g., 200 milliseconds).

In certain example implementations, device 102 and/or at least a portion of radio 112 may maintain or otherwise establish local clock information/signal or other like timing information/signal that may be calibrated with or otherwise associated in some manner with an SPS clock information/signal associated with an SPS. Such techniques and local clock circuitry are known.

Device 102 and/or at least a portion of radio 112 may, for example, be operatively enabled to transition per transition action 212 from second mode 204 to first mode 202. Various techniques are presented in subsequent sections illustrating certain exemplary tests and/or conditions that may be considered by controlling logic or the like to initiate transition action 212.

In certain exemplary implementations, transition action 212 may selectively switch device 102 and/or at least a portion of radio 112 back from the second mode to the first mode based, at least in part, on a timed condition 380 (see, FIG. 3, e.g., a timer, duty cycle, etc.) and/or other like mode-switching events. In certain exemplary implementations, timed condition 380 may be established and/or otherwise adjusted dynamically based, at least in part, on mode-switching test 320 and/or one more non-timed test conditions 322 and/or information associated therewith. Here, for example, processing unit 304 may be operatively enabled to establish timed condition 380.

To the contrary, rather than automatically transitioning from first mode 202 to second mode 204 based on a timed condition, controller 302 may be operatively enabled per the techniques herein to determine/verify that mode-switching test 320 is satisfied prior to initiating transition 210.

Also illustrated in FIG. 2 are some additional (optional) modes, which may be functionally implemented within first mode 202 (e.g., modifying in some manner first mode 202) and/or as functionally separate modes. In this illustration, for example, a third mode 206 and a fourth mode 208 are shown as separate modes of operation. It should be clear that claimed subject matter is not intended to be limited by these examples.

As shown, device 102 and/or at least a portion of radio 112 may, for example, be operatively enabled to transition from first mode 202 to either third mode 206 or fourth mode 208. Device 102 and/or at least a portion of radio 112 may, for example, also be operatively enabled to transition between third mode 206 and fourth mode 208. As described in greater detail below, in certain exemplary implementations, device 102 and/or at least a portion of radio 112 may be operatively enabled to prevent a transition (switch) from first mode 202 to second mode 204 if operating in either third or fourth modes, and/or similar modified first mode.

In other words, third and/or fourth modes may be implemented which act to prevent one or more of transition 210 and/or transition action 212 from occurring. For example, third and/or fourth modes may be implemented to prevent one or more of transition 210 and/or transition action 212 from occurring so as to receive Health Information from an SV. For example, GPS/GNSS Health information may be transmitted for about 12 seconds in every 750 second period. Thus, device 102 may be enabled to keep track of SPS time and switch to a third or fourth mode if it is determined that such Health Information may soon be received.

In another example, third and/or fourth modes may be implemented to prevent one or more of transition 210 and/or transition action 212 from occurring so as to allow reception and/or decoding of orbital data (Ephemeris) before the data expires, and/or as otherwise needed. Here, for example, such reception and/or decoding may occur roughly every 2, 4 or 6 hours (e.g., depending on the SV orbital parameters, data accuracy, data age, etc.) and a random time slot may be chosen before 30 minutes of expiry to decode the data. In this manner, device 102 may be enabled to continue to operate and generate periodic position fixes through orbital data changes.

By way of further example but not limitation, third and/or fourth modes may be operatively enabled to support certain navigation related operations that may be adversely affected should the mode/operations be interrupted. For example, third mode 206 may include at least one of an emergency service mode operation, an assisted service mode operation, an extended receiver-ON mode operation, an initializing mode operation, and/or the like.

By way of example but not limitation, third and/or fourth modes may be operatively enabled to support certain device related operations that may be adversely affected should the mode/operations be interrupted. For example, fourth mode 208 may include at least one of a device power charging mode operation, a device communicating mode operation, a detected device movement mode operation, and/or the like.

Figure 3:
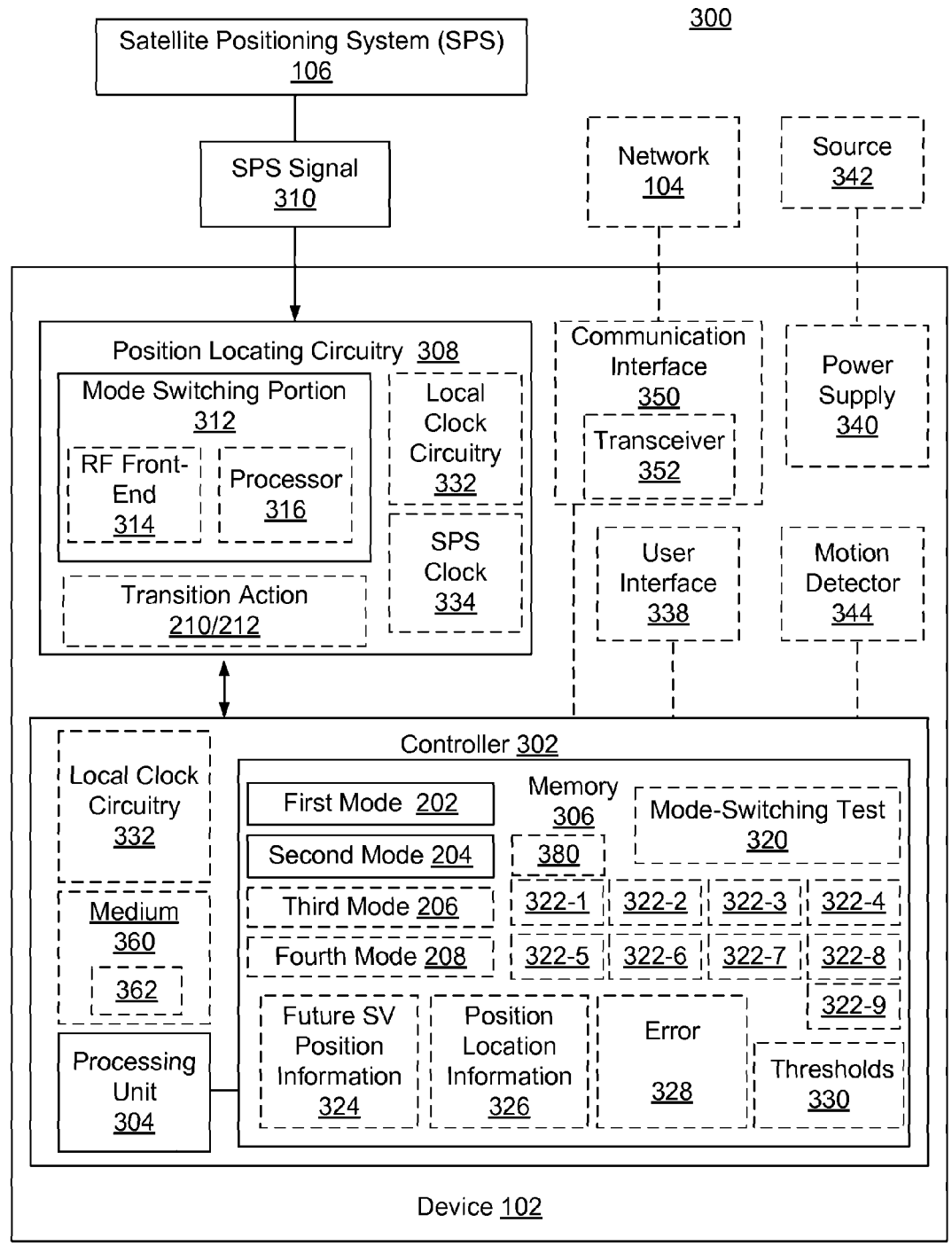
FIG. 3 is a block diagram illustrating certain features of an exemplary device that may, for example, be implemented in the environment of FIG. 1.

Reference is now made to FIG. 3, which is a block diagram is depicting an exemplary system 300 that may be operatively enabled for use in environment 100.

As shown, device 102 may include a controller 302 that may be coupled to position locating circuitry 308. Controller 302 or portions there of may be part of radio 112. Controller 302 may, for example, include one or more processing units 304. Controller 302 may include and/or otherwise operatively access memory 306. Controller 302 may, for example, include and/or otherwise operatively access a computer readable medium 360 having computer implementable instructions 362 and/or other like information/data stored thereon. In certain implementations, controller 302 may include all or a portion of local clock circuitry 332.

Position locating circuitry 308 or portions there of may be part of radio 112. Position locating circuitry may, for example, be operatively enabled to acquire SPS signal 310 transmitted by SPS 106. Position locating circuitry may, for example, include a mode-switching portion 312. All or part of mode-switching portion 312 may, for example, be operatively enabled to turn OFF/ON or otherwise alter its function based, at least in part, on transition action 210 and/or transition action 212, respectively. Mode-switching portion 312 may, for example, include at least one receiver having RF front-end circuitry 314, signal processor circuitry 316, etc. Position locating circuitry 308 may, for example, include all or portions of local clock circuitry 332, which may be calibrated with or otherwise associated with SPS clock 334. SPS clock 334 may be received and/or derived from SPS signal 310, for example.

As shown in this example, memory 306 may include or otherwise be operatively enabled to store and provide instructions and/or information relating at least one of the first mode 202, second mode 204, third mode 206 (optional), and/or fourth mode 208 (optional).

Memory 306 may include or otherwise be operatively enabled to store and provide instructions and/or information relating to at least one mode-switching test 320, which may be performed by processing unit 304 to determine if a particular transition action 210/212 may be provided or otherwise applied to position locating circuitry 308.

Mode-switching test 320 may, for example, be operatively enabled to consider one or more test conditions 322. In certain example implementations to initiate a transition action 210 (e.g., a switch from first mode 202 to second mode 204) one or more non-timed test conditions may be considered and/or combined as part of mode-switching test 320. By way of example but not limitation, such non-timed test conditions 322 may include: a first test condition 322-1, wherein wireless signals of at least a first threshold signal strength have been acquired from a first set of space vehicles (SVs); a second test condition 322-2 wherein wireless signals of at least the first threshold signal strength have been acquired from at least a first threshold number of SVs; a third test condition 322-3 wherein wireless signals of at least a second threshold signal strength have been acquired from at least a second threshold number of SVs; a fourth test condition 322-4 wherein SV position information is accessible for at least the first set of SVs; a fifth test condition 322-5 wherein no additional SV position information is currently being received for any of the first set of SVs; a sixth test condition 322-6 wherein no SVs are being acquired; a seventh test condition 322-7 wherein an error associated with a current position location as determined based, at least in part, on at least a portion of the wireless signals associated with the SPS does not exceed a position location error threshold; an eighth test condition 322-8 wherein the position locating circuitry is currently operating in the first mode; and/or a ninth test condition 322-9 wherein Satellite Health information is not currently being received for any of the SVs.

For example, at least a first portion of mode-switching test 320 may be satisfied if the first test condition 322-1, and the seventh test condition 322-7 and the eighth test condition 322-8 and at least one or more of the fourth test condition 322-4 and/or the fifth test condition 322-5 are determined by controller 302 to be TRUE. For example, another mode-switching test may be satisfied if such a first portion of the mode-switching test is satisfied and if at least one of both the second test condition 322-2 and the sixth test condition 322-6 are determined by the controller to be TRUE and/or the third test condition 322-3 is determined by controller 302 to be TRUE. Some additional examples for such tests, test conditions, and/or combinatorial decision processes are presented in subsequent sections.

As shown in the example implementation of FIG. 3, to support the mode-switching test 320 and/or certain test conditions 322, memory 306 may also include future SV position information 324, position location information 326, position location error information 328, and/or one or more threshold values 330.

Device 102 may include a communication interface 350 which may be operatively enabled to connect device 102 to network 104 and/or other like resources. As shown in this example, communication interface 350 may include a transceiver 352 and/or the like to support wired and/or wireless communications. Here, in certain implementations, one or more test conditions 322 may be associated with the status of communication interface 350. For example, communication interface may be implemented to support an operation associated with third 206 and/or fourth mode 208 that may lead to a mode-switching test failure, which may prohibit initiating transition action 210 and/or lead to the initiation of transition action 212.

Device 102 may include a user interface 338 which may be operatively enabled to at least receive user inputs. For example, user inputs may be received through a keypad, keyboard, mouse, button, microphone, camera, etc. In certain implementations, one or more test conditions 322 may be associated with a user input. For example, a user input may initiate an operation associated with third 206 and/or fourth mode 208 that may lead to a mode-switching test failure, which may prohibit initiating transition action 210 and/or lead to the initiation of transition action 212.

Device 102 may include a motion detector 344 which may be operatively enabled to determine whether device 102 may be moving and/or may be stationary. For example, motion detector 344 may include an accelerometer, gyroscope, etc. In certain implementations, one or more test conditions 322 may be associated with such motion detection. For example, detected movement and/or a stationary status may initiate an operation associated with third 206 and/or fourth mode 208 that may lead to a mode-switching test failure, which may prohibit initiating transition action 210 and/or lead to the initiation of transition action 212.

Device 102 may include a power supply 340 which may be operatively enabled to connect to an external power source 342. For example, power supply 340 may include one or more rechargeable batteries or the like, and power source 342 may include a corresponding charger/adapter. In certain implementations, one or more test conditions 322 may be associated with such connections/charging/power status. For example, if device 102 is connected to power source 342 an operation associated with third 206 and/or fourth mode 208 that may lead to a mode-switching test failure, which may prohibit initiating transition action 210 and/or lead to the initiation of transition action 212.

Figure 4:
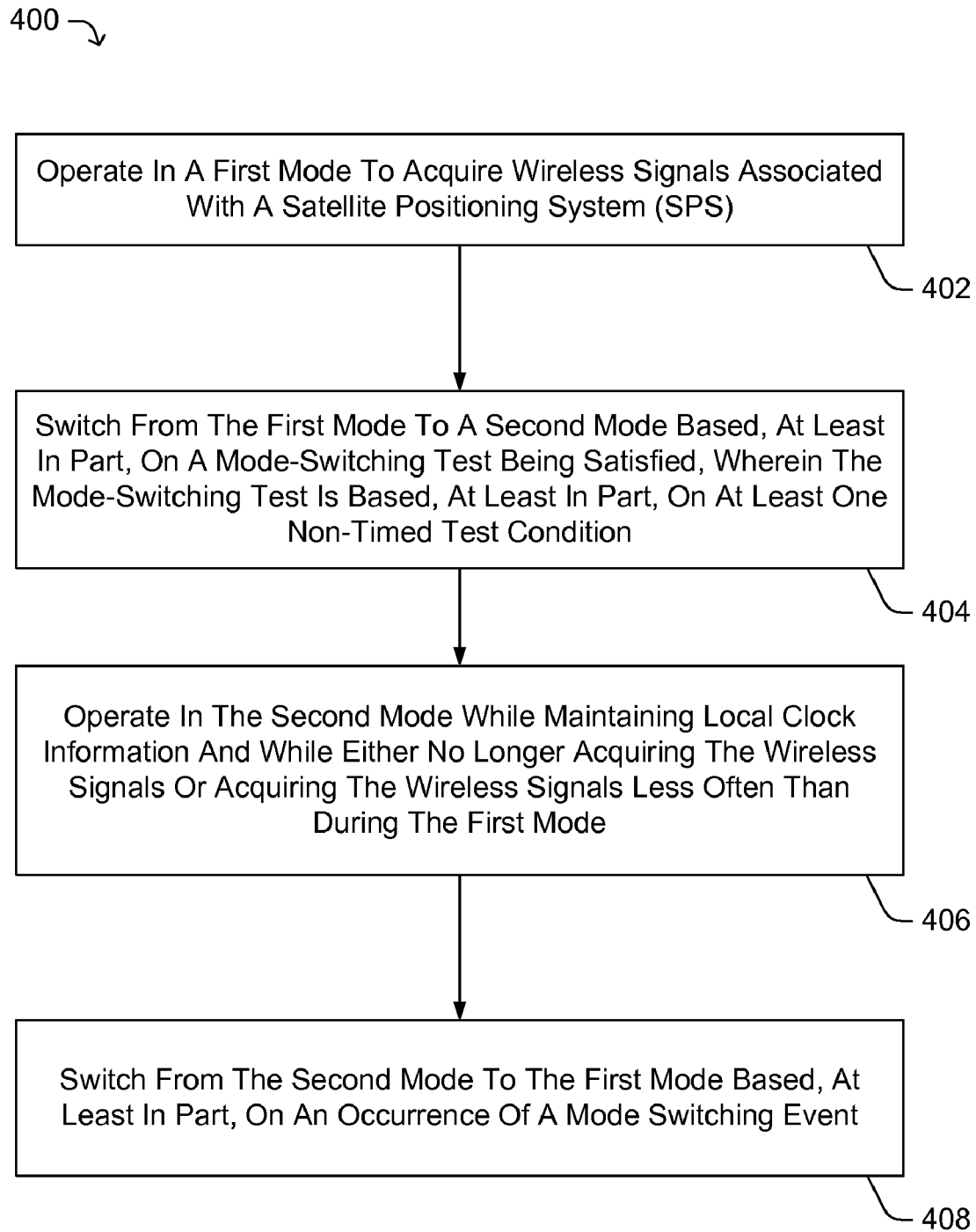
FIG. 4 is a flow diagram illustrating a method that may, for example, be implemented in an exemplary device that may, for example, be implemented in the environment of FIG. 1.

Reference is now made to FIG. 4, which is a flow diagram illustrating an exemplary method 400 that may, for example, be implemented in device 102 and/or the like.

At block 402, device 102 and/or a portion thereof may be operatively enabled to operate in a first mode to acquire wireless SPS signals.

At block 404, device 102 and/or a portion thereof may be operatively enabled to switch from the first mode to a second mode based, at least in part, on at least one mode-switching test being satisfied. Such mode-switching test may be based, at least in part, on at least one non-timed test condition.

At block 406, device 102 and/or a portion thereof may be operatively enabled to operate in the second mode while maintaining local clock information that may be substantially calibrated with a clock associated with the SPS and while either not acquiring wireless signals or acquiring wireless signals less often than during the first mode.

At block 408, device 102 and/or a portion thereof may be operatively enabled to switch from the second mode to the first mode based, at least in part, on an occurrence of a mode-switching event (e.g., transition action 212).

Some example mode-switching tests and test conditions will now be presented that may be implemented in device 102 for use with SPS 106 including GPS. These are but a few examples and as such are not intended to limit claimed subject matter.

In certain implementations, of device 102, power consumption is an important performance consideration. The techniques provided herein may be operatively enabled to allow certain devices to operate with reduced battery usage without significantly compromising on performance in terms of accuracy and/or response times.

As described herein, certain modes themselves and/or by selectively switching between certain modes may reduce the power consumption by turning selected portions of RF related circuitry and/or other associated hardware ON and OFF. Thus, for example, one or more modes may be selectively enabled as needed to decode or not to decode navigation.

As described below, the techniques herein may perform particularly well if the wireless SPS signals 310 are strong enough to be observed within a specified period. As mentioned, one potential benefit of such mode-switching techniques may be a reduction in power consumption without significantly affecting position location fix times and/or accuracy. However, in certain situations there may be a slight degradation in performance since SV signals are not acquired very often (e.g., not acquired while device 102 may be OFF as part of second mode 204). In certain implementations, code phase measurements may be noisier than those that may be obtained from extended acquisition operations (e.g., remaining in first mode 202, third mode 206, and/or possibly fourth mode 208). Moreover, carrier phase measurements may not be obtained since data-decoding may not be continuous.

Another potential affect of such mode-switching techniques may be that SV signals may not be acquired due to a limited duration with an RF ON period. For example, SV signals may not be acquired if a search operation coincides with an RF ON period. Thus, such affects may place additional test conditions on such mode-switching. For example, a test condition may be established such that mode transition 210 may occur if there are no unknown SVs and/or the search strategy is not engaged in an initial SV search.

In certain example implementations, there may be a chance that the search space exceeds a search capacity. However, an exception may occur, for example, if there are enough signals from SVs, which have been found to be strong, mode-switching may proceed if an accurate enough position fix may be determined. For example, in certain implementations a condition test may be established such that mode transition 210 may occur if at least six GPS SVs have strong enough signals (e.g., at least 35 dB-Hz). Here, the signals may be used to give some margin to isolate faulty measurements if possible. Thus, for example, in certain implementations, mode transition 210 may occur if all applicable GPS SVs are in a dedicated track, and/or at least six of the GPS SVs that are in a dedicated track have signals of at least 35 dB-Hz.

The examples above and also those below may provide non-timed test conditions that may be considered in determining as part of a mode-switching test if a mode transition 210 may occur.

For example, first test condition 322-1, wherein wireless signals of at least a first threshold signal strength have been acquired from a first set of SVs, may be operatively enabled for an exemplary GPS implementation such that all applicable SVs with $CN_o$>24 dB-Hz have GPS Time set (e.g., the CodePhase, BitPhase and Integer Millisecond is known for each SV).

For example, second test condition 322-2 wherein wireless signals of at least the first threshold signal strength have been acquired from at least a first threshold number of SVs may be operatively enabled for an exemplary GPS implementation such that there are at least four strong enough SVs (e.g., with $CN_o$>24 dB-Hz). Thus, by way of example but not limitation, a first threshold number of SVs may be four, and a first threshold signal strength may be at least 24 dB-Hz. In other implementations, a first threshold number of SVs may be less than or greater than four, and/or a first threshold signal strength may be less than or greater than 24 dB-Hz. For example, in certain implementations, the first threshold signal strength may be between 24 dB-Hz and 30 dB-Hz and/or the first threshold number of SVs may be between three and five.

For example, third test condition 322-3 wherein wireless signals of at least a second threshold signal strength have been acquired from at least a second threshold number of SVs may be operatively enabled for an exemplary GPS implementation such that at least six SVs in dedicated tracking are strong enough (e.g., with $CN_o$>35 dB-Hz). Thus, by way of example but not limitation, a second threshold number of SVs may be six, and a second threshold signal strength may be at least 35 dB-Hz. In other implementations, a second threshold number of SVs may be less than or greater than six, and/or a second threshold signal strength may be less than or greater than 35 dB-Hz. For example, in certain implementations, second threshold number of SVs may be between five and eight, and/or second threshold signal strength may be between 35 dB-Hz and 40 dB-Hz.

For example, fourth test condition 322-4 wherein SV position information is accessible for at least the first set of SVs may be operatively enabled for an exemplary GPS implementation such that Ephemeris and/or predictive orbital model information (e.g., XTRA Almanac Corrections, etc.) for all applicable SVs with $CN_o$>24 dB-Hz is known. Thus, by way of example but not limitation, a first set of SVs may be identified as having a signal strength of a particular strength. In other implementations, a first set of SVs may be identified in other manners, e.g., a set number, availability, applicability, range, direction, angle, etc.

As used herein, "SV position information" may include correction information associated with at least one satellite in should be in view. By way of example but not limitation, such correction information may include either orbital information derived from ephemeris and/or some similar data transmitted by the SVs and/or orbital information derived from predictive methods. In certain example implementations, correction information may include, for example, Ephemeris information that may be transmitted with a validity period of + or −2 hours from the TOE (time of ephemeris).

For example, fifth test condition 322-5 wherein no additional SV position information is currently being received for any of the first set of SVs may be operatively enabled for an exemplary GPS implementation such that if sub-frames 4 and 5 are being transmitted then there may be no need to receive and decode such because such Ephemeris (EPH) information may be transmitted in first 3 sub-frames.

For example, sixth test condition 322-6, wherein no SVs are being acquired, may be operatively enabled for an exemplary GPS implementation such that there may be no applicable SVs in a search list(s), e.g., all applicable SVs may be being subjected to one or more dedicated tracking operation (s) and/or the like.

For example, seventh test condition 322-7 wherein an error associated with a current position location as determined based, at least in part, on at least a portion of the wireless signals associated with the SPS does not exceed a position location error threshold may be operatively enabled for an exemplary GPS implementation such that the horizontal estimated position error (HEPE) or the like of the most recent computed position fix may be less than 50 meters. Thus, by way of example but not limitation, a position location error threshold may be 50 meters. In other implementations, a position location error threshold may be less than or greater than 50 meters. For example, the position location error threshold may include a threshold HEPE be between 30 meters and 100 meters.

For example, eighth test condition 322-8 wherein the position locating circuitry is currently operating in the first mode may be operatively enabled for an exemplary GPS implementation such that the navigation radio may be determined to not be in an extended receiver ON mode (e.g., not trying to decode EPH). For example, eighth test condition 322-8 wherein the position locating circuitry is currently operating in the first mode may be operatively enabled for an exemplary GPS implementation such that the device may not be supporting an E911 scenario (e.g., control plane (CP) UE assisted, CP UE based, and CP MS-assisted E911), and/or an MS-Assisted/UE-assisted scenario (e.g., for E911, or the like wherein accuracy and timing, and call may be more important than saving power). Additionally, eighth test condition 322-8 may also consider if any other modes and/or operations, such as, e.g., those presented herein with regard to third mode 206 and/or fourth mode 208.

For example, ninth test condition 322-9 wherein Satellite Health information is not currently being received for any of the SVs.

Two or more of the example test conditions 322 above may be combined in certain implementations. By way of example, first test condition 322-1 and second test condition 322-2 may be combined to produce a first test condition 322-1' (not shown) wherein, for example, wireless signals of at least a first threshold signal strength have been acquired from at least a first threshold number of SVs. In other example implementations, first test condition 322-1 may be combined with fourth test condition 322-4 and/or fifth test condition 322-5 to indicate that SV signal strength may be sufficient but that applicable Ephemeris information may be unavailable and/or new Ephemeris information may be being transmitted.

The methodologies described herein may be implemented by various means depending upon the application. For example, these methodologies may be implemented in hardware, firmware, software, or a combination thereof. For a hardware implementation, all or part of device 102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may, for example, be implemented with modules (e.g., procedures, functions, and so on) that perform the functions described herein. Any machine or computer readable medium tangibly embodying instructions may be used in implementing the methodologies described herein. For example, software codes or instructions and other data may be stored in memory, for example memory 306, and executed by processing unit 304 or other like circuits within device 102.

As used herein the term "memory" refers to any type of long term, short term, volatile, nonvolatile, or other memory and is not to be limited to any particular type of memory or number of memories, or type of media upon which information may be stored.

In certain exemplary implementations, the functions described herein may be implemented in hardware, software, firmware, or any combination thereof. If implemented in software, the functions may be stored on or transmitted over as one or more instructions or code on a computer-readable medium (e.g., 360). Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. An apparatus comprising:
   position locating circuitry operatively enabled to acquire wireless signals associated with a satellite positioning system (SPS) if operating in a first mode, and to maintain local clock information and to either not acquire said wireless signals or acquire said wireless signals less often than during the first mode if operating in a second mode; and
   a controller operatively coupled to said position locating circuitry and operatively enabled to selectively switch said position locating circuitry from said first mode to said second mode at least partially in response to at least one mode-switching test being satisfied, wherein said at least one mode-switching test is at least partially satisfied in response to detection of at least one non-timed test condition, said at least one non-timed test condition comprising at least a first test condition under which wireless signals greater than or equal to a first threshold signal strength have been acquired from a first set of space vehicles (SVs).

2. The apparatus as recited in claim 1, wherein said local clock information is substantially calibrated with a clock associated with said SPS.

3. The apparatus as recited in claim 1, wherein said at least one non-timed test condition further comprises at least one of:
   a second test condition under which wireless signals of at least said first threshold signal strength have been acquired from at least a first threshold number of SVs;
   a third test condition under which wireless signals of at least a second threshold signal strength have been acquired from at least a second threshold number of SVs;
   a fourth test condition under which SV position information is accessible for at least said first set of SVs;
   a fifth test condition under which no additional SV position information is currently being received for any of said first set of SVs;
   a sixth test condition under which no wireless signals from SVs are being acquired;
   a seventh test condition under which an error associated with a current position location determined based, at least in part, on at least a portion of said wireless signals associated with said SPS does not exceed a position location error threshold;

an eighth test condition under which said position locating circuitry is currently operating in said first mode; and/or a ninth test condition under which Satellite Health information is not currently being received for any of at least said first set of SVs.

4. The apparatus as recited in claim 3, wherein at least one of said first threshold signal strength is at least 24 dB-Hz, and/or said second threshold signal strength is at least 35 dB-Hz.

5. The apparatus as recited in claim 3, wherein at least one of said first threshold number of SVs comprises at least three SVs, and/or said second threshold number of SVs comprises at least five SVs.

6. The apparatus as recited in claim 3, wherein said SV position information comprises at least one of ephemeris information and/or correction information.

7. The apparatus as recited in claim 6, wherein said correction information comprises predictive orbital model information.

8. The apparatus as recited in claim 3, with said sixth test condition wherein no SVs are being acquired comprises said SVs being subjected to one or more dedicated tracking operations.

9. The apparatus as recited in claim 3, wherein said position location error comprises a horizontal estimated position error (HEPE).

10. The apparatus as recited in claim 9, wherein said position location error threshold comprises a threshold HEPE of between 30 meters and 100 meters.

11. The apparatus as recited in claim 3, wherein said first mode is different from said second mode, and wherein said second mode comprises a reduced power mode in which at least a portion of said position locating circuitry operatively enabled to acquire said wireless signals is turned OFF for at least a portion of a period of time.

12. The apparatus as recited in claim 3, wherein said first mode and said second mode are each different from a third mode comprising at least one of an emergency service mode, an assisted service mode, an extended receiver on mode, and/or an initializing mode.

13. The apparatus as recited in claim 3, wherein said first mode and said second mode are each different from a fourth mode comprising at least one of a device power charging mode, a device communicating mode, and/or a detected device movement mode.

14. The apparatus as recited in claim 3, wherein at least a first portion of said mode-switching test is satisfied if said first test condition, and said seventh test condition and said eighth test condition and at least one or more of said fourth test condition and/or said fifth test condition are determined by said controller to be TRUE.

15. The apparatus as recited in claim 14, wherein said mode-switching test is satisfied if said first portion of said mode-switching test is satisfied and if at least one of both said second test condition and said sixth test condition are determined by said controller to be TRUE and/or said third test condition is determined by said controller to be TRUE.

16. The apparatus as recited in claim 1, wherein said controller is operatively enabled to selectively switch said position locating circuitry from said second mode to said first mode based, at least in part, on an occurrence of a mode switching event.

17. The apparatus as recited in claim 16, wherein said mode switching event is associated with an established timed period and/or associated with said mode-switching test not being satisfied.

18. A method comprising:
with position locating circuitry operating in a first mode, acquiring wireless signals associated with a satellite positioning system (SPS);

selectively switching said position locating circuitry from said first mode to a second mode at least partially in response to at least one mode-switching test being satisfied, wherein said at least one mode-switching test is at least partially satisfied in response to detection of at least one non-timed test condition, said at least one non-timed test condition comprising at least a first test condition under which it is determined that wireless signals greater than or equal to a first threshold signal strength have been acquired from a first set of space vehicles (SVs); and with said position locating circuitry operating in said second mode, maintaining local clock information and either no longer acquiring said wireless signals or acquiring said wireless signals less often than during said first mode.

19. The method as recited in claim 18, wherein said local clock information is substantially calibrated with a clock associated with said SPS.

20. The method as recited in claim 18, wherein selectively switching said position locating circuitry from said first mode to said second mode based, at least in part, on said at least one mode-switching test being satisfied comprises determining a logical status of said at least one non-timed test condition, said at least one non-timed test condition further comprising at least one of:

a second test condition under which it is determined if wireless signals of at least said first threshold signal strength have been acquired from at least a first threshold number of SVs;

a third test condition under which it is determined if wireless signals of at least a second threshold signal strength have been acquired from at least a second threshold number of SVs;

a fourth test condition under which it is determined if SV position information is accessible for at least said first set of SVs;

a fifth test condition under which it is determined if no additional SV position information is currently being received for any of said first set of SVs;

a sixth test condition under which it is determined if no wireless signals from SVs are being acquired;

a seventh test condition under which it is determined if an error associated with a current position location determined based, at least in part, on at least a portion of said wireless signals associated with said SPS does not exceed a position location error threshold;

an eighth test condition under which it is determined if said position locating circuitry is currently operating in said first mode; and/or a ninth test condition under which Satellite Health information is not currently being received for any of at least said first set of SVs.

21. The method as recited in claim 20, wherein at least one of said first threshold signal strength is at least 24 dB-Hz, and/or said second threshold signal strength is at least 35 dB-Hz.

22. The method as recited in claim 20, wherein at least one of said first threshold number of SVs comprises at least three SVs, and/or said second threshold number of SVs comprises at least five SVs.

23. The method as recited in claim 20, wherein said SV position information comprises at least one of ephemeris information and/or correction information.

24. The method as recited in claim 23, wherein said correction information comprises predictive orbital model information.

25. The method as recited in claim 20, with said sixth test condition wherein it is determined if said SVs are being subjected to one or more dedicated tracking operations.

26. The method as recited in claim 20, wherein said position location error comprises a horizontal estimated position error (HEPE).

27. The method as recited in claim 26, wherein said position location error threshold comprises a threshold HEPE of between 30 meters and 100 meters.

28. The method as recited in claim 20, wherein said first mode is different from said second mode, and wherein said second mode comprises a reduced power mode in which at least a portion of said position locating circuitry operatively enabled to acquire said wireless signals is turned OFF for at least a portion of a period of time.

29. The method as recited in claim 20, wherein said first mode and said second mode are each different from a third mode comprising at least one of an emergency service mode, an assisted service mode, an extended receiver on mode, and/or an initializing mode.

30. The method as recited in claim 20, wherein said first mode and said second mode are each different from a fourth mode comprising at least one of a device power charging mode, a device communicating mode, and/or a detected device movement mode.

31. The method as recited in claim 20, wherein at least a first portion of said mode-switching test is satisfied if said first test condition, and said seventh test condition and said eighth test condition and at least one or more of said fourth test condition and/or said fifth test condition are determined to be TRUE.

32. The method as recited in claim 31, wherein said mode-switching test is satisfied if said first portion of said mode-switching test is satisfied and if at least one of both said second test condition and said sixth test condition are determined by said controller to be TRUE and/or said third test condition is determined to be TRUE.

33. The method as recited in claim 18, further comprising selectively switching said position locating circuitry from said second mode to said first mode based, at least in part, on an occurrence of a mode switching event.

34. The method as recited in claim 33, wherein said mode switching event is associated with an established timed period and/or associated with said mode-switching test not being satisfied.

35. An apparatus comprising:
means for acquiring wireless signals associated with a satellite positioning system (SPS) if the apparatus is operating in a first mode, means for maintaining local clock information while either not acquiring said wireless signals or acquiring said wireless signals less often than during said first mode if the apparatus is operating in a second mode; and
means for selectively switching an operation of the apparatus from said first mode to said second mode at least partially in response to at least one mode-switching test being satisfied, wherein said at least one mode-switching test is at least partially satisfied in response to detection of at least one non-timed test condition, said at least one non-timed test condition comprising at least a first test condition under which wireless signals greater than or equal to a first threshold signal strength have been acquired from a first set of space vehicles (SVs).

36. The apparatus as recited in claim 35, wherein said local clock information is substantially calibrated with a clock associated with said SPS.

37. The apparatus as recited in claim 35, further comprising at least one of:
means for establishing a second test condition under which wireless signals of at least said first threshold signal strength have been acquired from at least a first threshold number of SVs;
means for establishing a third test condition under which wireless signals of at least a second threshold signal strength have been acquired from at least a second threshold number of SVs;
means for establishing a fourth test condition under which SV position information is accessible for at least said first set of SVs;
means for establishing a fifth test condition under which no additional SV position information is currently being received for any of said first set of SVs;
means for establishing a sixth test condition under which no wireless signals from SVs are being acquired;
means for establishing a seventh test condition under which an error associated with a current position location determined based, at least in part, on at least a portion of said wireless signals associated with said SPS does not exceed a position location error threshold;
means for establishing an eighth test condition under which said position locating circuitry is currently operating in said first mode; and/or
means for establishing a ninth test condition under which Satellite Health information is not currently being received for any of at least said first set of SVs.

38. The apparatus as recited in claim 37, wherein at least one of said first threshold signal strength is at least 24 dB-Hz, and/or said second threshold signal strength is at least 35 dB-Hz.

39. The apparatus as recited in claim 37, wherein at least one of said first threshold number of SVs comprises at least three SVs, and/or said second threshold number of SVs comprises at least five SVs.

40. The apparatus as recited in claim 37, wherein said SV position information comprises at least one of ephemeris information and/or correction information.

41. The apparatus as recited in claim 40, wherein said correction information comprises predictive orbital model information.

42. The apparatus as recited in claim 37, said means for establishing said sixth test condition comprises means for establishing said SVs are being subjected to one or more dedicated tracking operations.

43. The apparatus as recited in claim 37, wherein said position location error comprises a horizontal estimated position error (HEPE).

44. The apparatus as recited in claim 43, wherein said position location error threshold comprises a threshold HEPE of between 30 meters and 100 meters.

45. The apparatus as recited in claim 37, wherein said first mode is different from said second mode, and wherein said second mode comprises a reduced power mode in which at least a portion of said means for acquiring said wireless signals is turned OFF for at least a portion of a period of time.

46. The apparatus as recited in claim 37, wherein said first mode and said second mode are each different from a third mode comprising at least one of an emergency service mode, an assisted service mode, an extended receiver on mode, and/or an initializing mode.

47. The apparatus as recited in claim 37, wherein said first mode and said second mode are each different from a fourth mode comprising at least one of a device power charging mode, a device communicating mode, and/or a detected device movement mode.

48. The apparatus as recited in claim 37, wherein at least a first portion of said mode-switching test is satisfied if said means for establishing said first test condition, and said means for establishing said seventh test condition and said means for establishing said eighth test condition and at least one or more of said means for establishing said fourth test condition and/or said means for establishing said fifth test condition are satisfied as being TRUE.

49. The apparatus as recited in claim 48, wherein said mode-switching test is satisfied if said first portion of said mode-switching test is satisfied and if at least one of both said means for establishing said second test condition and said means for establishing said sixth test condition are satisfied as being TRUE and/or said means for establishing said third test condition is satisfied as being TRUE.

50. The apparatus as recited in claim 35, further comprising means for selectively switching said operation of the apparatus from said second mode to said first mode based, at least in part, on an occurrence of a mode switching event.

51. The apparatus as recited in claim 50, wherein said mode switching event is associated with an established timed period and/or associated with said mode-switching test not being satisfied.

52. An article comprising:
a computer readable medium having computer implementable instructions stored thereon which if implemented by one or more processing units adapt the one or more processing units to:
determine if at least one mode-switching test is satisfied, said at least one mode-switching test being at least partially satisfied in response to detection of at least one non-timed test condition, said at least one non-timed test condition comprising at least a first test condition under which it is determined that wireless signals greater than or equal to a first threshold signal strength have been acquired from a first set of space vehicles (SVs); and
in response to said at least one mode-switching test being determined as being satisfied, selectively switch position locating circuitry operating in a first mode in which wireless signals associated with a satellite positioning system (SPS) are acquired to a second mode wherein local clock information is maintained but said wireless signals are either not being acquired or are being acquired less often than during the first mode.

53. The article as recited in claim 52, wherein said local clock information is substantially calibrated with a clock associated with said SPS.

54. The article as recited in claim 52, wherein said at least one non-timed test condition comprises at least one of:
a second test condition under which it is determined if wireless signals of at least said first threshold signal strength have been acquired from at least a first threshold number of SVs;
a third test condition under which it is determined if wireless signals of at least a second threshold signal strength have been acquired from at least a second threshold number of SVs;

a fourth test condition under which it is determined if SV position information is accessible for at least said first set of SVs;
a fifth test condition under which it is determined if no additional SV position information is currently being received for any of said first set of SVs;
a sixth test condition under which it is determined if no wireless signals from SVs are being acquired;
a seventh test condition under which it is determined if an error associated with a current position location as determined based, at least in part, on at least a portion of said wireless signals associated with said SPS does not exceed a position location error threshold;
an eighth test condition under which it is determined if said position locating circuitry is currently operating in said first mode; and/or
a ninth test condition under which Satellite Health information is not currently being received for any of said first set of SVs.

55. The article as recited in claim 54, wherein at least one of said first threshold signal strength is at least 24 dB-Hz, and/or said second threshold signal strength is at least 35 dB-Hz.

56. The article as recited in claim 54, wherein at least one of said first threshold number of SVs comprises at least three SVs, and/or said second threshold number of SVs comprises at least five SVs.

57. The article as recited in claim 54, wherein said SV position information comprises at least one of ephemeris information and/or correction information.

58. The article as recited in claim 54, wherein said correction information comprises predictive orbital model information.

59. The article as recited in claim 54, with said sixth test condition wherein it is determined if said SVs are being subjected to one or more dedicated tracking operations.

60. The article as recited in claim 54, wherein said position location error comprises a horizontal estimated position error (HEPE).

61. The article as recited in claim 60, wherein said position location error threshold comprises a threshold HEPE of between 30 meters and 100 meters.

62. The article as recited in claim 54, wherein said first mode is different from said second mode, and wherein said second mode comprises a reduced power mode in which at least a portion of said position locating circuitry operatively enabled to acquire said wireless signals is turned OFF for at least a portion of a period of time.

63. The article as recited in claim 54, wherein said first mode and said second mode are each different from a third mode comprising at least one of an emergency service mode, an assisted service mode, an extended receiver on mode, and/or an initializing mode.

64. The article as recited in claim 54, wherein said first mode and said second mode are each different from a fourth mode comprising at least one of a device power charging mode, a device communicating mode, and/or a detected device movement mode.

65. The article as recited in claim 54, wherein at least a first portion of said mode-switching test is satisfied if said first test condition, and said seventh test condition and said eighth test condition and at least one or more of said fourth test condition and/or said fifth test condition are determined to be TRUE.

66. The article as recited in claim 65, wherein said mode-switching test is satisfied if said first portion of said mode-switching test is satisfied and if at least one of both said second test condition and said sixth test condition are determined by said controller to be TRUE and/or said third test condition is determined to be TRUE.

67. The article as recited in claim 52, further comprising computer implementable instructions which if implemented by the one or more processing units adapt the one or more processing units to:
 selectively switch said position locating circuitry from said second mode to said first mode based, at least in part, on an occurrence of a mode switching event.

68. The article as recited in claim 67, wherein said mode switching event is associated with an established timed period and/or associated with said mode-switching test not being satisfied.

* * * * *